W. S. CRAINE & C. D. GAYLORD.
Feed-Steamer.

No. 206,864. Patented Aug. 13, 1878.

Attest:
Joseph Masury
O. B. Allen

Inventors:
W. S. Craine
Chas. D. Gaylord
By Geo. W. Tibbitts, Atty.

N. PETERS, PHOTO-LITHOGRAPHER, WASHINGTON, D C.

UNITED STATES PATENT OFFICE.

WILLIAM S. CRAINE AND CHARLES D. GAYLORD, OF CLEVELAND, OHIO.

IMPROVEMENT IN FEED-STEAMERS.

Specification forming part of Letters Patent No. 206,864, dated August 13, 1878; application filed January 9, 1878.

*To all whom it may concern:*

Be it known that we, WILLIAM S. CRAINE and CHARLES D. GAYLORD, both of Cleveland, in the county of Cuyahoga and State of Ohio, have invented certain new and useful Improvements in Stock-Feed Steamers and Evaporators, which improvements are fully set forth in the following specification and accompanying drawing, in which—

Figure 1:
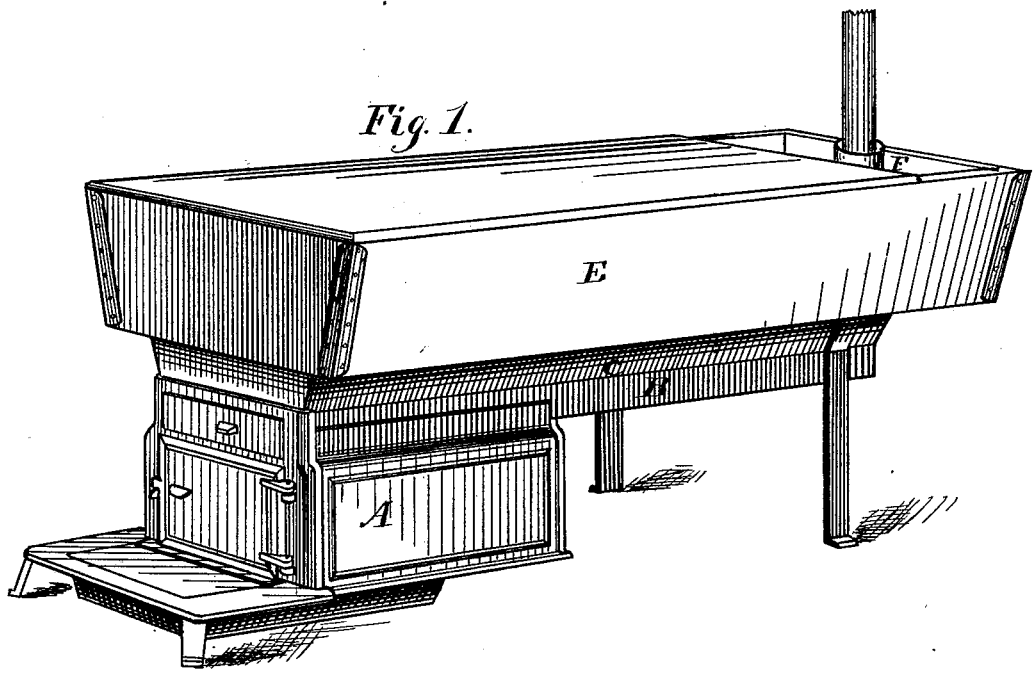
Figure 2:
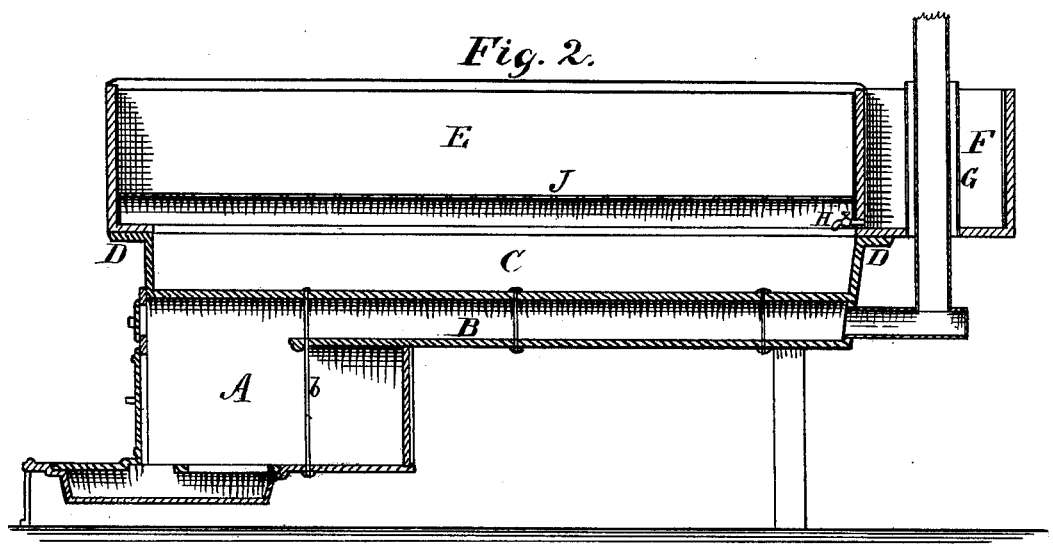

Figure 1 is a perspective view, and Fig. 2 is a longitudinal section.

The object of our invention is to furnish an apparatus for steaming food for cattle and for evaporating purposes; and the invention consists of a stove having combined therewith a peculiarly-constructed heat-flue and steam-generating chamber, surmounted by a steaming-box provided with a warm-water-supply reservoir, all constructed to operate substantially as hereinafter fully described and claimed.

In the drawing, A is a stove, provided with a hearth, ash-pit, and grate, and arranged longitudinally with the other parts of the apparatus. B is a smoke-flue and combustion-chamber, and C is a steam-generator. These two compartments are made of metal, and preferably in one piece, and fitting over the stove, and is secured thereto by a bolt, *b*. The front end of the bottom of the combustion-chamber is cut away to make a communication with the fire-place of the stove. The top edge of the steam-generator is provided with a wide flange, D, all around, and upon which the steaming-box E rests, and to which it is secured. The steaming-box E is made of wood, is considerably wider than the generating-chamber, extends a short distance over the front, and has an extension over the rear end, where is formed a tank or reservoir, F, for heating water to be supplied to the generating-chamber. The steaming-box E is provided with a perforated arched movable false bottom, J, or rather cover, over the said generating-chamber, upon which the food to be steamed lies. The box E is lined with sheet metal, as is also the water-tank F. Through the central part of the water-tank stands a pipe, G, through which the smoke-pipe from the combustion-chamber passes, the object of which is to utilize the heat of said smoke-pipe for heating the water in the tank. A water-cock, H, connects the tank with the generating-chamber, to be used in supplying warm water to said chamber when required. The generating-chamber may be provided with a gage-cock.

I am aware that it is not new to make agricultural boilers, so called, having a stove, combustion-chamber, steam-generating chamber, and a steaming-box arranged substantially as in this invention.

Having described our invention, we claim—

1. In a stock-feed steamer, a water-tank, F, arranged in connection with a steam-generating chamber, C, and provided with a pipe, G, through which passes the smoke-pipe of the heater, so that the heat from said smoke-pipe may be communicated to the water in the tank, and to that extent preheat the water for the generating-chamber.

2. In a stock-feed steamer, the heater A, combustion-chamber B, generating-chamber C, flange D, arched perforated removable false bottom J, and steaming-box E, substantially as shown, in combination with the reservoir F and its pipe G, substantially as and for the purpose described.

W. S. CRAINE.
CHAS. D. GAYLORD.

Witnesses:
  GEO. W. TIBBITTS,
  ALFRED ELWELL.